United States Patent Office 3,751,534
Patented Aug. 7, 1973

3,751,534
PROCESS FOR THE PRODUCTION OF LAMINAR CELLULAR ARTICLES
David Fairclough Oxley, St. Albans, England, assignor to Imperial Chemical Industries Limited, London, England
No Drawing. Continuation-in-part of abandoned application Ser. No. 723,248, Apr. 22, 1968. This application Apr. 8, 1971, Ser. No. 132,597
Claims priority, application Great Britain, May 3, 1967, 20,590/67, 20,591/67
Int. Cl. B29d 9/00, 27/00; B32b 7/02
U.S. Cl. 264—45                    15 Claims

ABSTRACT OF THE DISCLOSURE

Producing a laminate having a cellular core and an unfoamed surface skin by injecting a non-foamable thermoplastic composition and then a foamable thermoplastic composition into a mould and retaining the materials within the mould and thereafter enlarging the mould and allowing the foamable composition to foam.

This application is a continuation-in-part of application 723,248 filed Apr. 22, 1968, now abandoned.

The present invention relates to a process for the production of injection moulded articles having a foamed core and unfoamed surface skin and to the articles produced thereby.

It had been proposed that such articles may be made by injecting a thermoplastic resin composition containing a blowing agent into a mould cavity, at a temperature above the decomposition temperature of the blowing agent, retaining the composition within the mould for long enough to allow any desired setting of the resin adjacent to the walls to take place and then allowing the mould to open by a predetermined amount to allow the core of the resin to foam. The mould surfaces may, if desired, be cooled to enhance the setting of the resin adjacent to the walls. The expansion of the mould cavity may be instantaneous or may be at a controlled rate and may be effected by the pressure generated by the decomposition of the blowing agent and the relaxation of external pressures of the mould and/or by positive opening of the mould.

A disadvantage of this process, especially in the manufacture of large mouldings, is that due to the presence of the blowing agent in the surface material sink marks and voids tend to appear in the surface skin; furthermore, the gases generated by the decomposition of the blowing agent tend to prevent perfect contact between the thermoplastic material and the mould surface; this also leads to surface imperfections in the mouldings. It is an object of the present invention to provide a process for the production of articles having a foamed core and an unfoamed surface skin in which the tendency for sink marks or voids to occur in the surface skin is reduced.

According to the present invention we provide a process for the production of articles having a cellular core and an unfoamed surface skin comprising injecting a predetermined amount of an unfoamable thermoplastic resin composition into a mould cavity and subsequently, and before the central portion of said unfoamable composition has set, injecting a foamable thermoplastic resin composition containing a blowing agent at a temperature at or above the activation temperature of the blowing agent into the mould cavity, and maintaining the compositions within the mould for sufficient time to allow the foamable composition to foam and the compositions to set.

The relative proportions of the unfoamable composition and foamable composition used will depend on the thickness of the desired surface skin and the desired foam density. Sufficient of the unfoamable composition should be used to ensure adeque skin thickness throughout the moulding. If too little of the unfoamable composition is used, then there is a risk that, on injection of the foamable composition, the foamable composition will burst through the skin of the unfomable composition and hence give rise to undesirable foamed surface portions. If an unnecessarily large proportion of the unfoamable composition is used then the skin will be thicker than necessary and so the overall density of the article will be higher than it need be. The actual proportions of the foamable and unfoamable compositions that may be used will depend, inter alia, on the physical characteristics of each composition, the shape of the mould cavity and the moulding conditions.

The optimum proportions for any particular article are most easily determined by simple experiments making the desired article and varying the proportions of the foamable and unfoamable compositions.

The total amounts of material injected will of course also depend upon the size of the mould cavity.

The walls of the mould may, if desired, be cooled to enhance the setting of the thermoplastic resin composition adjacent thereto.

The moulds used in the process of the present invention may have a mould cavity of constant volume or the cavity may be enlargeable to allow the foamable composition to expand.

When a constant volume mould cavity is used the total volume of unfoamable composition and foamable, but as yet unfoamed, composition injected into the mould cavity is less than the volume of the mould cavity, so that the foamable composition can foam in the mould cavity to give the desired foam density.

Where a mould having an enlargeable cavity is used a predetermined amount of expansion of the mould cavity is preferably allowed to take place after the foamable composition has been injected into the mould, so as to allow the foamable composition to expand. This controlled timing of the expansion allows the formation of particularly uniform foams. If desired, this expansion may be delayed to allow some of the foamable composition adjacent to the unfoamable composition to set and so become part of the surface skin of the mouldings. The mould cavity may be enlarged by instantaneously relieving the pressure holding opposed surfaces of the mould together and allowing the gas pressure generated by the activation of the blowing agent to open the mould, thus allowing the foamable composition to expand to fill the larger mould cavity; alternatively the pressure holding opposed surfaces of the mould together may be reduced slowly thus allowing a controlled expansion of the mould. The expansion of the mould may be effected entirely by the pressure of the gases generated by the bolwing agent or external forces may be applied to help enlarge the mould cavity.

Where an enlargeable mould cavity is utilised, the total volume of the unfoamable composition and foamable, but as yet unfoamed, composition injected into the mould cavity is preferably substantially equal to the volume of the mould cavity before enlargement, so that, in this preferred embodiment, foaming of the foamable composition only takes place on enlargement of the mould cavity. Sometimes it may be desirable to inject more of the foamable composition than is necessary to fill the mould cavity so as to cause the cavity to enlarge slightly during the injection. After completion of injection the cavity is enlarged further to cause foaming.

We have found that by first injecting an unfoamable thermoplastic resin composition into the mould cavity instead of injecting only a foamable composition, as the foamable composition is contained within an envelope of the unfoamable composition, the tendency for the surface of the article to exhibit blemishes such as pock marks is markedly reduced. This is because no foaming at the surface can take place and so bubbles of gas derived from the foaming agent are not formed adjacent the mould cavity walls. Furthermore, if the foamable and the unfoamable compositions are obtained from separate sources, the process of the present invention has the added advantage that, if any pigments, fillers or other additives which improve the surface finish of the article are to be included in the moulding, they need only be included in the unfoamable composition. For example, additives which improve the resistance of the article to moisture or light, such as ultra-violet light stabilisers need only be included in the unfoamable composition. This may result in considerable financial saving as smaller amounts of these additives or compositions containing them may be used and many of these additives are expensive. Examples of fillers which may be included to improve the stiffness of the moulding includes glass and asbestos fibers or glass and mica plates, optionally coated with a resin to improve adhesion between the filler and the thermoplastic. If desired, different additives may be included in the foamable and unfoamable compositions. Additives that may be etched to improve the adhesive properties of the surface may be included in the unfoamable composition, for example, titanium dioxide may be included and may subsequently be etched out with chromic acid.

An additional advantage of the process of the present invention is that the presence of the blowing agent in the core of the moulding creates a pressure which urges the thermoplastic compositions to fill the mould. This counteracts the tendency of the materials to shrink as they cool down in the mould which is a disadvantage when moulding solid mouldings as it leads to the material shrinking away from the mould walls which results in surface imperfections in the moulding.

The steps of the process are dependent only on the physical properties of the thermoplastic resin compositions and the particular chemical natures of the thermoplastic resin compositions are unimportant to the process steps. Hence, any thermoplastic resin which may be injection moulded may be used in the process in the unfoamable composition or the foamable composition. Since any thermoplastic resin composition which is essentially stable at elevated temperatures sufficient to make the composition flowable may be injection moulded, the term injection mouldable thermoplastic resin composition is defined herein as any thermoplastic resin composition which is essentially heat stable at temperatures sufficient to render the composition flowable and hence injection mouldable. Examples of suitable injection mouldable thermoplastic resins which may be incorporated in the unfoamable or foamable compositions include polymers and copolymers of α-olefines, such as high and low density polyethylene, polypropylene, polybutene, poly-4-methyl pentene-1, propylene/ethylene copolymers, copolymers of 4-methyl pentene-1 with linear α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene, chlorine, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate; polyvinyl butyral; polystyrene; styrene/acrylonitrile copolymers; polyacrylonitrile; copolymers of butadiene with methyl methacrylate and/or styrene and optionally acrylonitrile; polymethyl methacrylate; copolymers of methyl methacrylate with minor amounts of alkyl acrylates such as methyl acrylate, ethyl acrylate and butyl acrylate; copolymers of methyl methacrylate, N-aryl maleimides and optionally styrenes; and vinylidene chloride/acrylonitrile copolymers; melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers such as chlorinated polyvinyl chloride.

Injection mouldable compositions containing cross-linked or cross-linkable thermoplastic materials may be utilised; for example copolymers of methyl methacrylate with glycol dimethacrylate.

Other injection mouldable thermoplastic polymers that may be used include condensation polymers such as the injection moulding grades of linear polyesters such as polyethylene terephthalate; polyamides such as polycaprolactam, polyhexamethylene adipamide and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates; thermoplastic polymers and copolymers of formaldehyde; thermoplastic linear polyurethanes; and the thermoplastic derivatives of cellulose such as cellulose acetate, cellulose nitrate and cellulose butyrate.

Where a copolymer is used, the amounts of the co-monomers that are used in the various copolymers will depend, inter alia, on the properties required of the moulding.

Blends of these thermoplastic resins may also be used in the foamable or unfoamable compositions. The choice of the resin will depend upon the use to which the article is to be put, for example, if a stiff panel is required to form, for example, part of the body of a motor car then a stiff outer skin is required and polypropylene is a suitable resin. However, if a flexible moulding is required, for example, for the interior trim of a motor car, then a plasticised vinyl chloride polymer will be eminently suitable as the unfoamable thermoplastic resin.

The thermopastic resin or resins in the foamable composition may be the same as, or different from the thermoplastic resin or resins in the unfoamable composition. Thus the foamable composition may be the same as the unfoamable composition except for the addition of foaming agent. Alternatively, while the polymers in the foamable and unfoamable compositions may be identical, other ingredients, apart from the use of foaming agent in the foamable composition, may vary between the foamable and unfoamable compositions. Thus, as mentioned above, if desired, fillers or pigments may be incorporated in the unfoamable composition that are not present in the foamable composition.

Also polymers that are different but of similar chemical nature may be utilised. Thus the foamable composition may, for example, comprise a resin of similar chemical nature but different physical properties, e.g. different molecular weight, to that in the unfoamable composition.

Alternatively the polymers may be chemically different: for example a polypropylene composition may be used for one composition while a propylene/ethylene copolymer is used in the other composition; alternatively the polymers can also be quite distinct chemically: thus for example, a methyl methacrylate copolymer may be used in one composition while a vinyl chloride copolymer is used in the other composition. Various combinations are described in the specific examples described hereinafter.

In one embodiment of the invention at least part of one or more walls of the mould cavity may be lined with a removable insert prior to the injection of the thermoplastic resin compositions into the mould. The thermoplastic resin composition will then adhere to the insert when it is injected into the mould and thus this technique may be used to provide a rigid backing to the cellular article having the unfoamed skin. This is particularly useful in the production of flexible mouldings such as the interior trim of a motor vehicle where it is desirable to have a resilient trim with a pleasing surface which can be rigidly mounted in the motor vehicle; in this case one of the walls of the mould may be lined to provide the backing to mount the trim whereas the other is not lined thus providing the pleasing surface. Examples of suitable lining materials include wooden sheets such as plywood and hardboard, metal sheets or sheets of thermoplastic materials which do not melt at the moulding temperatures. The lining could if desired be of a flexible material.

There are several methods by which the process of the present invention may be operated. In one method a predetermined amount of the unfoamable composition is introduced into the front of the barrel of a conventional injection moulding machine and the foamable composition introduced into the barrel behind the unfoamable composition. This method however suffers from the disadvantage that if the process is operated repetitively, which is desirable, the second and subsequent shots of unfoamable composition are being introduced into a region of the barrel of the machine which already contains some of the foamable composition and, thus, mixing of the two occurs. A more convenient, and our preferred method, is to use two injection barrels, both of which feed material through a common sprue into the mould. The operation of the machine is synchronised so that the required quantity of unfoamable composition is first introduced into the mould so that the nozzle is emptied and further unfoamable composition may be introduced into the mould without it mixing with any of the foamable composition. Alternatively two injection moulding machines may be used, each of which injects material through separate nozzles into the mould, the timing of the operation of the machines being correlated so that the desired amount of unfoamable composition is first introduced into the mould and is then followed by the desired amount of the foamable composition; some foamable composition may be introduced before all the unfoamable composition has been introduced. In operation of the present invention wherein an article having a foamed core entirely surrounded by an unfoamed skin is to be produced, it is essential that the foamable composition be introduced to within the charge of unfoamable composition that is in the mould. In this way the injection and expansion of the foamable composition urges the unfoamable composition onto the interior surface of the mould somewhat like the blowing up of a ballon. Thus, it is preferred that both the unfoamable and the foamable compositions be injected into the mould through the same nozzle. If this is not the case, the points at which the two nozzles introduce the compositions into the mould should be sufficiently close that the foamable composition is introduced to within the charge of the unfoamable composition.

In a further embodiment of the present invention a second amount of the unfoamable composition may be injected into the mould after the foamable composition. An advantage of using this technique is that the second amount of the unfoamable composition removes any residual foamable composition there may be in the injection nozzle and thus leaves the nozzle clean for the next moulding operation.

The surface of the moulds used in the present invention may be textured to impart any desired surface finish to the moulded article. For example, the mould surface may be smooth, grained, matt or have a regular pattern thereon so as to impart a corresponding surface finish to the unfoamed skin of the article. Alternatively, the mould may be coated with a high temperature resistant material, for example, silicone rubber, to impart a desired surface finish.

The blowing agents which may be used to foam the thermoplastic materials may be solids or liquids, which decompose on heating to yield a gas which effects foaming, or may be liquids, which vaporise on heating or on the reduction of the pressure to effect foaming, or may be gaseous. The liquids are preferably organic liquids which are inert to and may be absorbed by the thermoplastic resin composition. The gas liberated by the solid type of blowing agent should preferably be inert to the thermoplastic resin. The activation temperature of the blowing agent is the temperature at which the thermoplastic resin composition containing the blowing agent would foam if unconstrained from foaming by superatmospheric pressure. This temperature is determined by the nature of the blowing agent; for example if the blowing agent is a solid that liberates a gas on heating, the temperature of the foamable composition as it leaves the nozzle should be above the temperature at which the gas is liberated. If, however, the blowing agent is a liquid which vaporises on heating, the conditions under which the gas is liberated will depend on both the temperature of the foamable composition and the pressure to which it is subjected; in this situation the temperature of the composition as it leaves the nozzle should be sufficiently high that, when a constant volume mould cavity is used, the gas will be formed under the pressures to which the material is subjected in the mould and, when a mould with an enlargeable cavity is used, the gas will be formed when the pressure on the mould cavity is relieved to allow it to expand. The foamable composition may be brought to this temperature either by heating it to the required temperature as it passes along the barrel although the pressure inside the barrel should be sufficiently high to prevent foaming or by maintaining the temperature in the barrel below the activation temperature and relying on dynamic heating of the material as it is ejected through the nozzle to raise it to the activation temperature. This second method is our preferred method. Examples of suitable liquid blowing agents include hydrocarbons such as pentane and the halo- and polyhalo-hydrocarbons; examples of suitable solid blowing agents include the nitrogen liberating blowing agents, for example the azo and hydrazo compounds, and also the carbon dioxide liberating blowing agents, for example the azo and hydrazo compounds, and also the carbon dioxide liberating blowing agents for example carbonates and bicarbonates. Examples of gases which may be used as blowing agents include nitrogen and carbon dioxide. In some instances it may be necessary to include a nucleating agent in the foamable material to provide sites for bubble formation.

The use of the various blowing agents described above is to be in accordance with the well established knowledge in the art and further description herein is unnecessary.

The process of the present invention may be used to produce a wide variety of articles having a foamed core with an unfoamed skin. Articles having a rigid or a flexible skin may be prepared; examples of articles with a rigid skin include pieces of luggage—for example suitcases, articles of furniture for example chair seats and television cases and panels which may be building panels or panels to form the bodies of motor vehicles and trains. Examples of articles with a flexible surface skin include parts for the interior trim of motor cars, railway carriages, caravans, aeroplanes, seat covers for example car seat covers, shoe soles, and a wide variety of other applications. Protuberances, such as ribs or bosses by which the article may be attached to a supporting member, may be integrally moulded with the article and the process of the present invention has the added advantage that these relatively thick protuberances may be moulded without the formation of voids or sink marks in the surface of the article at that point. If such thick protuberances are moulded without a foamed core sink marks tend to appear because of the contraction of the relatively large amount of material at that point.

The present invention is illustrated but in no way limited by reference to the accompanying examples.

EXAMPLE 1

An 18 inch diameter disc mould was fitted on an 18 oz. injection moulding machine which had a 350 ton hydraulic lock on the mould.

The unfoamable composition was a plasticised polyvinyl chloride composition (of B.S. Softness 40) containing

| | Parts by weight |
|---|---|
| Polyvinyl chloride | 100 |
| Di-iso-octyl phthalate (plasticiser) | 80 |
| Epoxidised soya bean oil | 2 |
| Stearic acid | 0.3 |

Sufficient of this composition to fill ⅓ of the barrel of the injection moulding machine was placed in the machine and allowed to reach the front of the barrel. The remainder of the barrel was then filled with a plasticised polyvinyl chloride composition of the same formulation but additionally containing 1 part by weight of diphenyl decyl phosphite (Kicker) and 3 parts by weight of azodicarbonamide paste (blowing agent) per 100 parts by weight of polyvinyl chloride.

The azodicarbonamide paste was made up by mixing equal weights of azodicarbonamide and di-iso-octyl phthalate on a mill.

The temperature along the barrel of the machine was gradually increased from 160° C. to 200° C. just before the nozzle, the nozzle itself being at 190° C. The complete charge was injected into the mould which had a cavity ⅟₁₆ inch wide and allowed to cool therein for 1 second. The pressure holding the mould closed was then reduced and the mould allowed to open so that its cavity was ⁵⁄₁₆ inch wide and the composition allowed to cool. Finally the mould was completely opened and the sample removed.

A moulding having a surface skin ⅟₃₂ inch thick and a foamed core ¼ inch thick and density 0.4 gram/cc. was obtained. The moulding had a pleasing appearance and the surface of the moulding had fewer imperfections than a moulding produced by repeating the moulding cycle with a charge composed entirely of foamable material. The process was repeated using a red unfoamable composition and a moulding having an unfoamed, red surface skin and a blue foamed core with a sharp linear distinction between the two was obtained.

EXAMPLE 2

A charge of a composition comprising a propylene copolymer containing about 6% by weight of combined ethylene units and 15% by weight, based on the weight of the composition, of asbestos fibres sufficient to fill one half of the barrel of the injection moulding machine used in Example 1 was fed to the machine and allowed to reach the front of the barrel. The remainder of the barrel was then filled with a composition comprising the same propylene copolymer mixed with 0.35% by weight, based on the weight of the propylene copolymer, of azodicarbonamide (as blowing agent). The temperature along the barrel ranged from 215° C. just before the nozzle to 160° C. at the rear of the screw.

The complete charge was injected into the mould which had a cavity ³⁄₃₂ inch wide and allowed to cool therein for 3 seconds. The pressure holding the mould closed was then reduced and the mould allowed to open until its cavity was ¼ inch wide; the sample was then allowed to cool before the mould was completely opened and the sample removed.

A moulding having a surface skin of asbestos filled propylene copolymer ⅟₃₂ inch thick and a foamed core of density 0.4 grams/cc. was obtained. The moulding obtained had fewer surface imperfections than a moulding produced by repeating the moulding cycle with a charge composed entirely of asbestos filled propylene copolymer containing 0.35% by weight of azodicarbonamide.

EXAMPLE 3

A mould 12½ inches in diameter and 2½ inches deep was fitted to the injection moulding machine used in the previous examples. A charge of a composition comprising a propylene/ethylene copolymer containing about 6% by weight of combined ethylene units and a red pigment sufficient to fill ¼ of the barrel of the injection moulding machine was introduced to the machine and allowed to reach the front of the barrel. The remainder of the barrel was then filled with a composition comprising the same propylene copolymer mixed with 0.35% by weight, based on the weight of the propylene copolymer, of azodicarbonamide (as blowing agent). The temperature along the barrel of the machine was gradually increased from 160° C. to 195° C. before the nozzle; the nozzle itself being at 190° C.

The complete charge was then injected into the mould which had a cavity ⅛ inch wide and allowed to cool therein for 1 second. The pressure holding the mould closed was then reduced and the mould allowed to open so that the cavity became ¼ inch wide. The sample was allowed to cool before the mould was opened completely and the sample removed.

A moulding having a surface skin ⅟₃₂ inch thick and a foamed core ³⁄₁₆ inch thick and of density 0.4 grams/cc. was obtained. The moulding was formed with a rib 1 inch deep and ⅟₁₆ inch thick and, as well as having a blemish free surface, the moulding was free from sink marks in its surface opposite the point where this rib was formed.

In the following examples mouldings were prepared using injection moulding machines consisting of two injection barrels mounted to inject material into a mould through a common sprue. One of the injection barrels fed the unfoamable composition and the second barrel fed the foamable composition. The operation of the moulding machine was synchronised so that a charge of the unfoamable composition in an amount insufficient to fill the mould was first injected into the mould from the first injection barrel. The injection pressure of the first barrel was then relaxed. The foamable composition was then injected from the second barrel to within the charge of unfoamable material already in the mould. The foamable composition was injected at a temperature above the activation of the blowing agent incorporated therein, but under such pressure that the mould was filled without any substantial foaming taking place. The pressure required to inject the thermoplastic compositions into the mould will vary from example to example. In the machines used, the maximum pressure available for injection was 20,000 p.s.i.

The mould which was used in the process was a vertical flash type mould and after the mould had been filled, the clamping forces holding the mould halves together were relaxed so that the forces generated within the mould moved the mould halves away from each other to enlarge the volume of the mould cavity to allow the foamable material already in the mould to foam. Finally the mould was opened and the moulded article removed from the mould.

In all these examples the temperatures given for the injection of the compositions into the mould are the temperature of the heater around the injection nozzle when that composition is being injected. The composition itself will be at a somewhat higher temperature as it enters the mould cavity because it will be heated by frictional heating as it flows through the nozzle.

EXAMPLE 4

A seed box shaped mould was used which had an initial cavity thickness of 0.125 inch. Oil at about 100° C. was circulated within the mould walls. 9.43 cu. inches of the unfoamable composition, a copolymer of 4-methyl pentene-1, was injected into the mould over a period of 6 seconds at a temperature of 310° C. Then 34.4 cu.

inches of the foamable composition, which was a copolymer of propylene and ethylene containing 7.5% by weight of ethylene units and containing 0.4% by weight of the azodicarbonamide as blowing agent, was injected at a temperature of 280° C., using the available injection pressure to ensure filling of the mould.

Afetr two seconds the pressure holding the two mould halves together was relaxed to allow the mould halves to move further apart to enlarge the cavity to the thickness of 0.325 inch thus allowing the foamable composition to foam. Finally after a moulding cycle of 45 seconds the mould was opened and the moulding was found to have a smooth substantially void free surface of poly-4-methylpentene-1 and a good bond between the unfoamed skin and the foamed ethylene propylene copolymer core.

EXAMPLE 5

A seed box shaped mould was used which had an initial cavity thickness of 0.130 inch and was cooled by water circulating within the mould walls. 17.3 cu. inches of the unfoamable composition, which was a red pigmented copolymer of 92% by weight of methyl methacrylate and 8% by weight of butyl acrylate, was injected into the mould for over a period of 2 seconds at a temperature of 225° C. 30 cu. inches of the foamable composition, which was polystyrene containing 1.5% by weight of azodicarbonamide and 0.5% by weight of sodium carbonate as blowing agent, was then injected at a temperature of 260° C. using the available injection pressure to ensure filling of the mould. The total injection time was 6 seconds.

After a further 4 seconds the pressure holding the two mould halves together was relaxed to allow the mould halves to move further apart to enlarge the cavity to a thickness of 0.180 inch thus allowing the foamable composition to foam. Finally after a moulding cycle of 40 seconds the mould was opened and the moulding was found to have a smooth substantially void free surface of the methyl methacrylate copolymer.

EXAMPLE 6

The moulding cycle of Example 5 was repeated using a copolymer of acrylonitrile, butadiene and styrene in place of the polystyrene. A moulding having a good surface finish and a strong skin to foam core bond was obtained.

EXAMPLE 7

A seed box shaped mould was used which had an initial cavity thickness of 0.110 inch and was cooled by water at 20° C. circulating within the mould walls. 17.3 cu. inches of the unfoamable composition which was a copolymer of 97% by weight of methyl methacrylate and 3% by weight ethyl acrylate, was injected into the mould at a temperature of 270° C. Then 24.5 cu. inches of the foamable composition, which was a copolymer of acrylonitrile, butadiene and styrene containing 2% by weight of azodicarbonamide as blowing agent, was injected at a temperature of 250° C. The total injection time was 6 seconds.

After a further 2 seconds the pressure holding the two mould halves together was relaxed to allow the mould halves to move further apart to enlarge the cavity to a thickness of 0.135 inch thus allowing the foamable composition to foam. Finally after a moulding cycle of 60 seconds the mould was opened and the moulding removed.

EXAMPLE 8

The process of Example 7 was repeated injecting 14.1 cu. inches of a copolymer of propylene and ethylene containing 7.5% by weight of ethylene units as the unfoamable composition into the mould at 265° C., the mould walls being cooled to about 60° C. 24.5 cu. inches of an acrylonitrile/styrene/butadiene copolymer containing 2% by weight of azodicarbonamide was injected at 250° C. as the foamable composition. Again a satisfactory moulding was obtained.

EXAMPLE 9

A mould shaped to produce a car panel was used which had an initial cavity thickness of 0.115 inch. Water at about 60° C. was circulated within the mould walls. 15.7 cu. inches of the unfoamable composition, which was a black pigmented polypropylene homopolymer containing 40% by weight of asbestos fibres, was injected into the mould at a temperature of 260° C. under a maximum pressure of 8000 p.s.i. 14.7 cu. inches of the foamable composition, which was a propylene/ethylene copolymer containing 7.5% by weight of ethylene units and containing 0.4% by weight of azodicarbonamide as blowing agent, was then injected at a temperature of 225° C. also under a maximum pressure of 8000 p.s.i. After injection of the foamable composition, 0.25 cu. inch of a third shot, consisting of the unfoamable composition was injected in order to clear the sprue of any residual foamable composition. The total injection time was 7.5 seconds.

After 1 further second the pressure holding the two mould halves together was relaxed to allow the mould halves to move further apart to enlarge the cavity by 0.130 inch thus allowing the foaamble composition to foam. Finally after a moulding cycle of 60 seconds, the mould was opened and the moulding was found to have a smooth substantially void free surface and a good bond between the unfoamed skin and the foamed core.

EXAMPLE 10

An 18 inch diameter disc shaped mould was used which had an initial cavity thickness of 0.100 inch and was cooled by water at about 30° C. circulating within the mould walls. 19.6 cu. inches of the unfoamable composition, which was a copolymer of propylene and ethylene containing 7.5% by weight of ethylene units, was injected into the mould at a temperature of 230° C. Then 39.3 cu. inches of the foamable composition, which was the same as the unfoamable composition but containing 0.4% by weight of azodicarbonamide as blowing agent, was injected at a temperature of 220° C. The total injection time was 7 seconds.

After 1 further second the pressure holding the two mould halves together was relaxed to allow the mould halves to move further apart to enlarge the cavity to a thickness of 0.230 inch thus allowing the foamable composition to foam. Finally after a moulding cycle of 80 seconds the mould was opened and the moulding removed.

EXAMPLE 11

A disc shaped mould of diameter 5.5 inches was used which had an initial cavity thickness of 0.625 inch and was cooled by water at 15° C. circulating within the mould walls. 6 cu. inches of the unfoamable composition which was red pigmented polystyrene was injected into the mould at a temperature of 220° C. Then 9.3 cu. inches of the foamable composition, which was a polystyrene containing 1% by weight of azodicarbonamide as blowing agent, was injected at a temperature of 220° C. The total injection time was 4 seconds.

After a further ½ second the pressure holding the two mould halves together was relaxed to allow the mould halves to move further apart to enlarge the cavity to a thickness of 0.900 inch thus allowing the foamable composition to foam. Finally after a moulding cycle of 3 minutes the mould was opened and the moulding removed.

EXAMPLE 12

An uncooled seed box shaped mould was used which had an initial cavity thickness of 0.150 inch. 19.6 cu. inches of the unfoamable composition, which was polyhexamethylene adipamide, was injected into the mould at a temperature of 295° C. Then 27.0 cu. inches of the foamable composition, which was a copolymer of 90% by weight of hexamethylene diamine adipate and 10% by wenght of hexamethylene diamine isophthalate containing 2% by weight of a mixture of phosphoric acid and lithium carbonate as blowing agent, was injected at a temperature of 270° C. The total injection time was 4.5 seconds.

After a further ½ second the pressure holding the two mould halves together was relaxed to allow the mould halves to move further apart to enlarge the cavity to a thickness of 0.300 inch thus allowing the foamable composition to foam. Finally after a moulding cycle of 80 seconds, the mould was opened and the moulding was found to have a smooth substantially void free surface.

EXAMPLE 13

A mould shaped as a bonnet of a British Leyland Motor Company Morris 1100 automobile which had an initial cavity thickness of 0.150 inch and was cooled by water at 50° C. circulating within the mould walls was used. 157 cu. inches of the unfoamable composition, which was a black pigmented copolymer of acrylonitrile, butadiene and styrene, was injected into the mould at a temperature of 260° C. 226 cu. inches of the foamable composition, which was polystyrene containing 2% by weight of azodicarbonamide as blowing agent, was then injected at a temperature of 220° C. After injection of the foamable composition, 0.75 cu. inch of a third shot, consisting of the unfoamable composition, was injected in order to clear the sprue of any residual foamable composition. The total injection time was 6.5 seconds.

After 1 further second the pressure holding the two mould halves together was relaxed to allow the mould halves to move further apart to enlarge the cavity to a thickness of 0.350 inch thus allowing the foamable composition to foam. Finally after a moulding cycle of 60 seconds the mould was opened and the moulding was found to have a smooth substantially void free surface and a reasonable bond between the unfoamed skin and the foamed core.

EXAMPLE 14

Example 13 was repeated, injecting 108 cu. inches of a red pigmented copolymer of propylene and ethylene containing 7.5% by weight of ethylene units as the unfoamable composition into the mould at about 250° C. 297 cu. inches of the foamable composition which was the same propylene/ethylene copolymer containing 0.5% by weight of azodicarbonamide as blowing agent was injected at 210° C. Again 0.75 cu. inch of the unfoamable composition was used as a third shot. The overall injection time was 8.5 seconds and the total moulding cycle 3 minutes. The bond between the unfoamed skin and the foamed core was excellent. The moulding weighed 10 lbs. compared to an equivalent steel automobile bonnet which weighed 22 lbs.

EXAMPLE 15

Example 13 was repeated but using 108 cu. inches of a black pigmented propylene homopolymer containing 40% by weight of asbestos fibres as the unfoamable composition, which was injected at 280° C.

EXAMPLE 16

A 4 foot square mould which had an initial cavity thickness of 0.170 inch and was maintained at an average temperature of 45° C. by water circulating within the mould walls. 229 cu. inches of the unfoamable composition, which was a cross-linked copolymer of 17.5% by weight of butyl acrylate grafted onto 82.5% by weight of a copolymer of 90% by weight of methyl methacrylate and 10% by weight of styrene, was injected into the mould at a temperature of 265° C. 398 cu. inches of the foamable composition, which was a copolymer containing 97% by weight of methyl methacrylate units and 3% by weight of ethyl acrylate units and containing 0.5% by weight of azodicarbonamide as blowing agent, was then injected at a temperature of 220° C. The total injection time was 14 seconds.

After a further ½ second the pressure holding the two mould halves together was relaxed to allow the mould halves to move further apart to enlarge the cavity to a thickness of 0.370 inch thus allowing the foamable composition to foam. Finally after a moulding cycle of 2.5 minutes the mould was opened and the moulding removed.

EXAMPLE 17

A lawn mower hood shaped was used which had an initial cavity thickness of 0.125 inch. Water at 60° C. was circulated within the mould walls. 29.5 cu. inches of the unfoamable composition, which was an acrylonitrile/butadiene/styrene copolymer, was injected into the mould at a temperature of 230° C. 88 cu. inches of the foamable composition which was the same acrylonitrile/butadiene/styrene copolymer containing 0.5% by weight of azodicarbonamide as blowing agent, was then injected at a temperature of 220° C. The total injection time was 5 seconds.

After a further ½ second the pressure holding the two mould halves together was relaxed to allow the mould halves to move further apart to enlarge the cavity to a thickness of 0.275 inch thus allowing the foamable composition to foam. Finally after a moulding cycle of 90 seconds the mould was opened and the moulding removed.

EXAMPLE 18

Example 17 was repeated except that the unfoamable composition was a mixture of equal weights of the acrylonitrile/butadiene/styrene copolymer and polystyrene. The blowing agent used in the foamable composition was a mixture of 0.5% by weight of azodicarbonamide and 0.2% by weight of sodium bicarbonate. The final mould cavity thickness was 0.295 inch.

EXAMPLE 19

An 18 inch diameter disc shaped mould which had an initial cavity thickness of 0.125 inch was used. Water at about 50° C. was circulated within the mould walls. 15 cu. inches of the unfoamable composition, which was a plasticised vinyl chloride homopolymer composition containing 90 parts by weight of plasticiser for each 100 parts by weight of polymer, was injected at a temperature of 180° C. Then 30.2 cu. inches of the foamable composition, which was similar to the unfoamable composition but containing 0.75% by weight of azodicarbonamide as blowing agent, was then injected at a temperature of 175° C. using the available injection pressure to ensure filling of the mould. The total injection period was 5 seconds.

After 1 further second the pressure holding the two mould halves together was relaxed to allow the mould halves to move further apart to enlarge the cavity to a thickness of 0.375 inch thus allowing the foamable composition to foam. Finally after a moulding cycle of 60 seconds the mould was opened and the moulding was found to have a smooth substantially void free surface of polyvinyl chloride and a good bond between the unfoamed skin and the foamed core.

EXAMPLE 20

A bowl shaped mould of diameter 12.5 inches which had an initial cavity thickness of 0.125 inch was used. Water at about 40° C. was circulated within the mould walls. 19.7 cu. inches of the unfoamable composition, which was a plasticised vinyl chloride homopolymer composition containing 60 parts by weight of plasticiser and 20 parts by weight of a filler for each 100 parts by weight of polymer, was injected into the mould at a temperature of 185° C. using a maximum pressure of 14,000 p.s.i. Then 29.4 cu. inches of the foamable composition, which was an ethylene/vinyl acetate copolymer of melt flow index 3 and containing 24% by weight of vinyl acetate units and containing 0.75% by weight of azodicarbonamide and 1% by weight zinc oxide as blowing agent, was then injected at a temperature of 170° C. under a maximum pressure of 20,000 p.s.i. The total injection period was 5 seconds.

After one second the pressure holding the two mould halves together was relaxed to allow the mould halves to move further apart to enlarge the cavity to a thickness of 0.325 inch thus allowing the second thermoplastic material to foam. Finally after a moulding cycle of 2.5 minutes the mould was opened and the moulding was found to have a good bond between the unfoamed skin and the foamed ethylene/vinyl acetate copolymer core.

EXAMPLE 21

Example 20 was repeated using 1% by weight of azodicarbonamide and 1% by weight of zinc oxide as blowing agent. A moulding with good surface finish and a strong bond between the core and the skin was obtained. The foam density was less than that of Example 20.

EXAMPLE 22

A seed box shaped mould was used which had an initial cavity thickness of 0.100 inch. Water at an average temperature of about 45° C. circulated within the mould walls. 20.5 cu. inches of the unfoamable composition, which was a copolymer of 92% by weight of methyl methacrylate and 8% by weight of butyl acrylate, was injected into the mould at a temperature of 253° C. under a maximum pressure of 15,000 p.s.i. Then 19.6 cu. inches of the foamable composition, which was a vinyl chloride homopolymer composition containing 80 parts by weight of a vinyl chloride homopolymer, about 5 parts by weight of plasticiser, 20 parts by weight of a copolymer of 85% by weight of methyl methacrylate and 10% by weight of N-ortho-chlorophenyl maleimide and 5% by weight of styrene, 10 parts by weight of a particulate filler and 4 parts by weight of azodicarbonamide as blowing agent, was injected at a temperature of 185° C. under a maximum pressure of 18,000 p.s.i. The total injection time was 5½ seconds.

The pressure holding the two mould halves together was then relaxed to allow the mould halves to move further apart to enlarge the cavity to a thickness of 0.280 inch thus allowing the foamable composition to foam. Finally after a moulding cycle of slightly less than 2 minutes the mould was opened and the moulding was found to have a smooth substantially void free surface and a good bond between the unfoamed skin and the foamed core.

A panel for a Rootes Motors Sunbeam Alpine car was moulded using a mould which had an initial cavity thickness of 0.125 inch and was cooled by circulating water having an average temperature of about 35° C. within the mould walls. 12.6 cu. inches of the unfoamable composition, which was a polyvinyl chloride homopolymer composition containing 60 parts by weight of plasticizer and 20 parts by weight of a particulate filler for each 100 parts by weight of polymer, was injected into the mould at a temperature of 175° C. Then 14.7 cu. inches of the foamable composition, which was another polyvinyl chloride homopolymer composition containing about 100 parts by weight of plasticiser for each 100 parts by weight of polymer and 0.75% by weight of azodicarbonamide as blowing agent, was injected at a temperature of 170° C. under a maximum pressure of 8,000 p.s.i. After injection of the foamable composition, 0.25 cu. inch of a third shot, consisting of the unfoamable composition, was injected in order to clear the sprue of any residual foamable composition. The total injection time was 4 seconds.

The pressure holding the two mould halves together was then relaxed to allow the mould halves to move further apart to enlarge the cavity to a thickness of 0.325 inch thus allowing the foamable composition to foam. Finally after a moulding cycle of 90 seconds the mould was opened and the moulding was found to have a smooth substantially void free surface and a good bond between the unfoamed skin and the foamed core.

The vinyl chloride polymer compositions used in Examples 1 and 19 to 23 all contained standard proportions of conventional additives such as lubricants and stabilisers.

I claim:

1. In a process for the production of articles comprising a cellular core and an unfoamed surface skin by injecting a thermoplastic resin composition containing a blowing agent into a mold cavity by means of an injection moulding machine, the improvement comprising injecting an unfoamable injection mouldable thermoplastic resin composition into a mould cavity, and before the central portion of said unfoamable composition has set, injecting a foamable injection mouldable thermoplastic resin composition containing a blowing agent into the said unfoamable composition to substantially fill the mould, said foamable composition being at a temperature above the activation temperature of the blowing agent therein and the pressure on the foamable composition within the mould is such that foaming is substantially prevented, and subsequently enlarging the volume of the mould cavity to allow the substantially unfoamed thermoplastic resin composition containing the blowing agent within the unfoamable composition to foam and maintaining the compositions within the mould cavity for sufficient time to allow them to set.

2. A process according to claim 1 in which the walls of the mould cavity are cooled to enhance the setting of the resin composition.

3. A process according to claim 1 in which the mould cavity is permitted to enlarge by instantaneously relieving the pressure holding opposed surfaces of the mould together.

4. A process according to claim 1 in which the pressure holding opposed surfaces of the mould together is gradually reduced, thus allowing a controlled expansion of the mould.

5. A process according to claim 1 in which the enlargement of the mould is effected by the pressures generated within the mould by the gas generated by the blowing agent.

6. A process according to claim 1 in which at least part of one or more walls of the mould cavity is lined with a removable insert prior to the injection of the thermoplastic resin compositions into the mould.

7. A process according to claim 1 in which the unfoamable composition and the foamable composition are introduced into an injection nozzle from two separate injection barrels, the introduction of the compositions to the nozzle being synchronized so that the required quantity of unfoamable composition is first injected into the mould cavity and then the required quantity of the foamable composition is injected into the mould cavity.

8. A process according to claim 1 in which a second amount of the unfoamable composition is injected into the mould after the foamable composition.

9. A process according to claim 1 in which the blowing agent comprises a volatile organic liquid.

10. A process according to claim 1 in which the blowing agent comprises a solid which decomposes on heating to yield a gas which is inert to the thermoplastic material.

11. A process according to claim 1 in which the unfoamable composition and the foamable composition are of the same thermoplastic resin.

12. A process according to claim 1 wherein the unfoamable composition is introduced into the front of the barrel of an injection moulding machine and the foamable composition is introduced into the barrel behind said unfoamable composition and the materials are then injected into the mould cavity.

13. A process according to claim 1 wherein the thermoplastic resin component of each of the foamable and unfoamable compositions comprises at least one polymeric material selected from the group consisting of polymers of α-olefines, halogenated α-olefine polymers; polymers of vinyl chloride, vinyl acetate, vinyl butyral, styrene, substituted styrenes, acrylonitrile, butadiene, methyl methacrylate, vinylidene chloride; halogenated vinyl chloride polymers; copolymers of tetrafluoroethylene and hexafluoropropylene; linear polyesters; polyamides; copolyamides; polysulphones; copolysulphones; polyphenylene oxides; polycarbonates; thermoplastic linear polyurethanes; and thermoplastic cellulose derivatives.

14. In a process for the production of articles comprising a cellular core and an unfoamed surface skin by injecting a thermoplastic resin composition containing a blowing agent into a mold cavity by means of an injection molding machine, the improvement comprising injecting an unfoamable injection moldable thermoplastic resin composition into a mold cavity, and before the central portion of said unfoamable composition has set, injecting a foamable injection moldable thermoplastic resin composition containing a blowing agent into the said unfoamable composition to substantially fill the mold, said foamable composition being at a temperature above the activation temperature of the blowing agent therein and the pressure on the foamable composition within the mold is such that foaming is substantially prevented, and subsequently enlarging the volume of the mold cavity to allow the substantially unfoamed thermoplastic resin composition containing the blowing agent within the unfoamable composition to foam and maintaining the compositions within the mold cavity for sufficient time to allow them to set, said thermoplastic resin being at least one member of the group consisting of polymers of alpha-olefins, polymers of vinyl chloride, polymers of styrene, polymers of methylmethacrylate and polyesters.

15. In a process for the production of articles comprising a cellular core and an unfoamed surface skin by injecting a thermoplastic resin composition containing a blowing agent into a mold cavity by means of an injection molding machine, the improvement comprising injecting an unfoamable injection moldable thermoplastic resin composition into a mold cavity, and before the central portion of said unfoamable composition has set, injecting a foamable injection moldable thermoplastic resin comopsition containing a blowing agent into the said unfoamable composition to substantially fill the mold, said foamable composition being at a temperature above the activation temperature of the blowing agent therein and the pressure on the foamable composition within the mold is such that foaming is substantially prevented, and subsequently enlarging the volume of the mold cavity to allow the substantially unfoamed thermoplastic resin composition containing the blowing agent within the unfoamable composition to foam and maintaining the compositions within the mold cavity for sufficient time to allow them to set, said thermoplastic resin being at least one member of the group consisting of polymers of alpha-olefins, halogenated alpha-olefin polymers; polymers of vinyl chloride, vinyl acetate, vinyl butyral, styrene, substituted styrene, acrylonitrile, butadiene, methyl methacrylate, vinylidene chloride; halogenated vinyl chloride polymers; copolymers of tetrafluoroethylene and hexafluoropropylene; linear polyesters; polyamides, copolyamides; polysulphones; copolysulphones; polyphenylene oxides; polycarbonates; thermoplastic linear polyurethanes; and thermoplastic cellulose derivatives.

References Cited
UNITED STATES PATENTS

| | | | |
|---|---|---|---|
| 3,058,161 | 10/1962 | Beyer et al. | 264—329 |
| 3,384,691 | 5/1968 | Weissman et al. | 264—55 |
| 2,768,407 | 10/1956 | Lindemann | 264—329 |
| 3,339,240 | 9/1967 | Corbett | 264—48 |
| 3,378,612 | 4/1968 | Dietz | 264—54 XR |
| 2,996,764 | 8/1961 | Ross et al. | 264—328 XR |
| 3,211,605 | 10/1965 | Spaak et al. | 264—51 XR |
| 3,086,249 | 4/1963 | Nelson | 264—328 XR |
| 3,268,636 | 8/1966 | Angel | 264—48 XR |

DONALD J. ARNOLD, Primary Examiner

J. B. LOWE, Assistant Examiner

U.S. Cl. X.R.

264—53, 54, 55, 241, 328, 338, DIG 5

UNITED STATES PATENT OFFICE
CERTIFICATE OF CORRECTION

Patent No. 3,751,534        Dated August 7, 1973

Inventor(s) DAVID FAIRCLOUGH OXLEY

It is certified that error appears in the above-identified patent and that said Letters Patent are hereby corrected as shown below:

Column 3, line 66, "chlorine" should be --chloride--;

Column 10, line 24, "foaamble" should be --foamable--;

Column 13, between lines 49 and 50, "EXAMPLE 23" should be inserted.

Signed and sealed this 16th day of April 1974.

(SEAL)
Attest:

EDWARD M. FLETCHER, JR.
Attesting Officer

C. MARSHALL DANN
Commissioner of Patents